United States Patent [19]
Kadoya et al.

[11] Patent Number: 4,793,923
[45] Date of Patent: Dec. 27, 1988

[54] GRADIENT DENSITY FILTER MEDIUM

[75] Inventors: Teruichi Kadoya, Hamakita; Tatsuo Ohta, Hamamatsu; Takashi Nagashima, Tokigawa; Daisuke Horiuchi, Tokyo; Masayuki Okazaki, Niiza; Naoki Ebisui, Kamifukuoka, all of Japan

[73] Assignees: Toyo Roki Seizo K.K., Shizuoka; Honda Giken Kogyo K.K., Tokyo, both of Japan

[21] Appl. No.: 145,696

[22] Filed: Jan. 15, 1988

Related U.S. Application Data

[63] Continuation of Ser. No. 866,223, May 22, 1986, abandoned.

[51] Int. Cl.$^4$ .............................................. B01D 39/14
[52] U.S. Cl. .................................. 210/491; 210/496; 210/505; 55/487
[58] Field of Search ................. 55/484, 485, 486, 487, 55/489; 210/488, 489, 490, 491, 503, 505, 496, 510.1

[56] References Cited

U.S. PATENT DOCUMENTS

| | | | |
|---|---|---|---|
| 3,690,852 | 9/1972 | Smith et al. | 55/485 |
| 3,815,341 | 6/1974 | Hamano | 55/486 |
| 4,073,732 | 2/1978 | Lauer et al. | 55/487 |
| 4,093,437 | 6/1978 | Ichihara et al. | 55/487 |
| 4,111,815 | 9/1978 | Walker et al. | 55/486 |
| 4,257,791 | 3/1981 | Wald | 55/487 |
| 4,522,876 | 6/1985 | Hiers | 55/486 |
| 4,528,008 | 7/1985 | Takagi et al. | 55/485 |
| 4,619,674 | 10/1986 | Erdmannsdörfer | 55/486 |

Primary Examiner—Richard V. Fisher
Assistant Examiner—Wanda L. Millard
Attorney, Agent, or Firm—Emmanual J. Lobato; Robert E. Burns

[57] ABSTRACT

A filter medium for filtration of a fluid to flow therethrough from an upstream side to a downstream side thereof, said filter medium comprising a substrate having a density gradient wherein the density is high on the upstream side and low on the downstream side of the substrate.

9 Claims, 6 Drawing Sheets

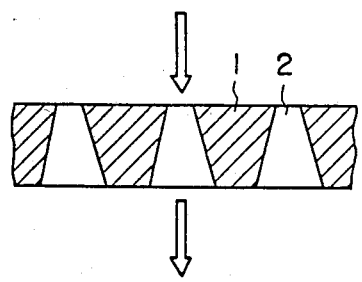
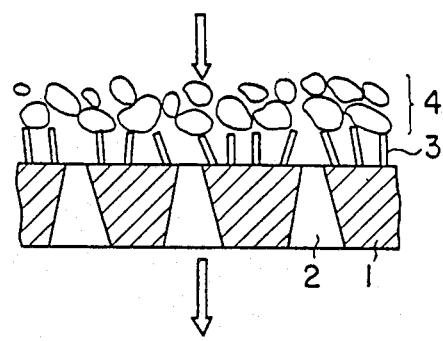
FIG. 1  FIG. 2
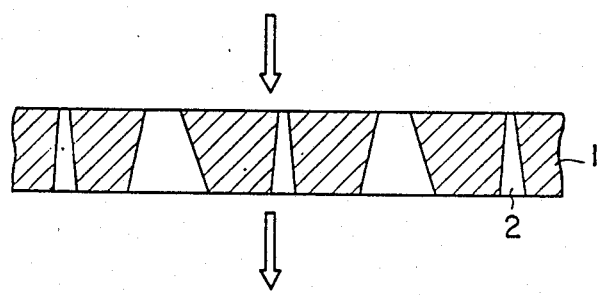
FIG. 3
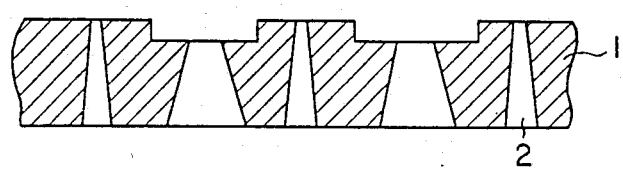
FIG. 4A
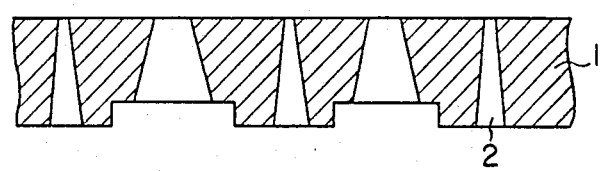
FIG. 4B

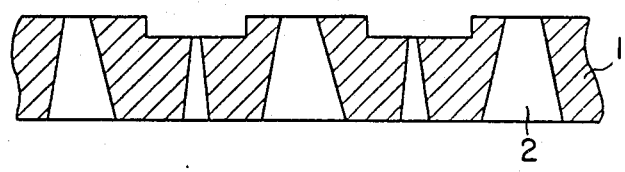
F I G. 5A
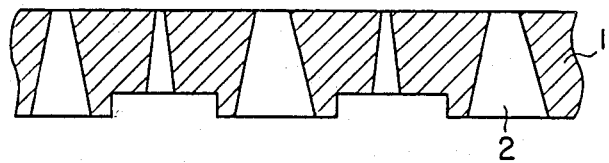
F I G. 5B
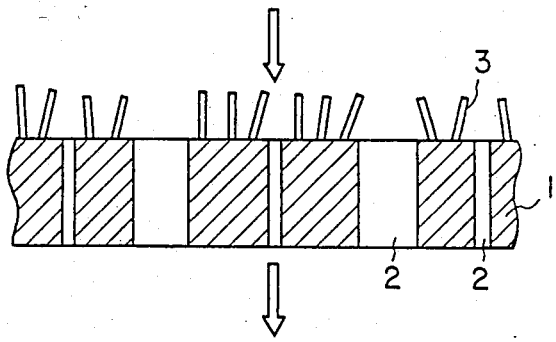
F I G. 6
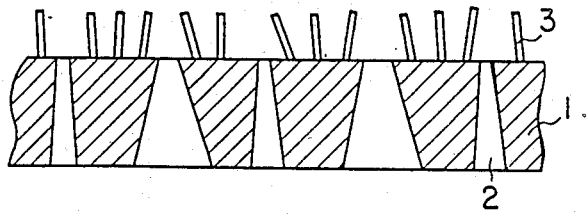
F I G. 7

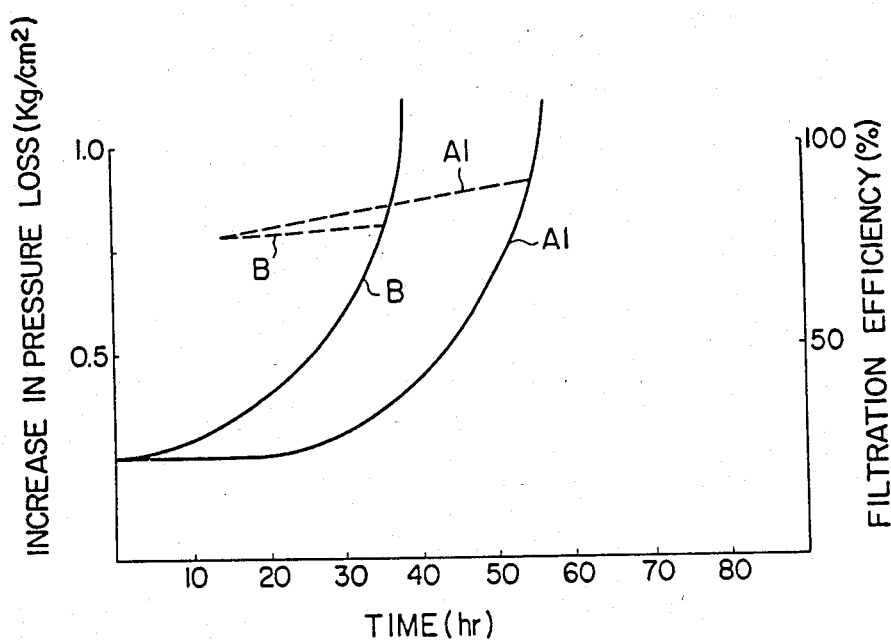
F I G. 11
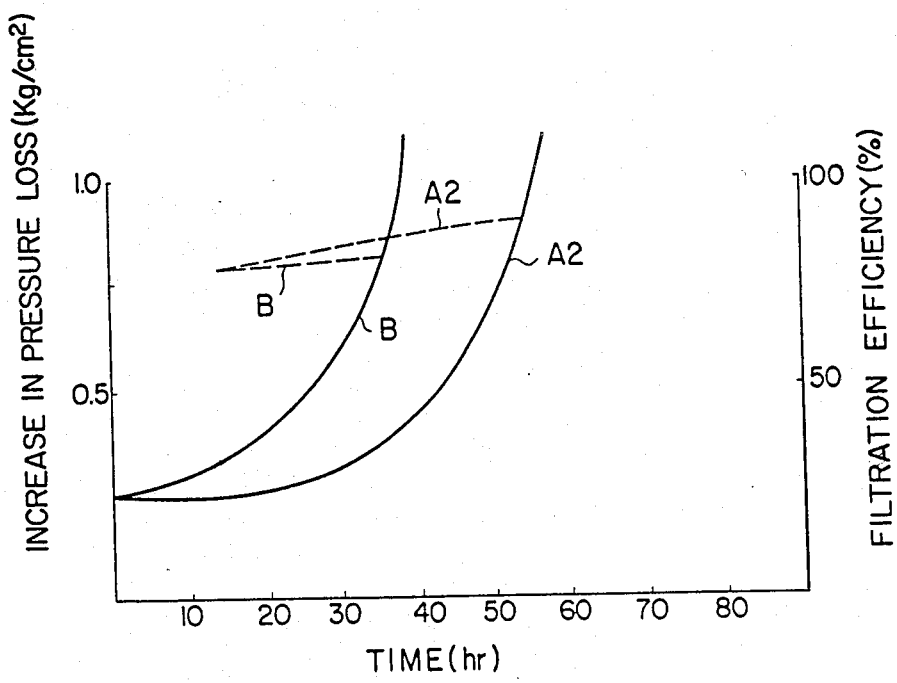
F I G. 12

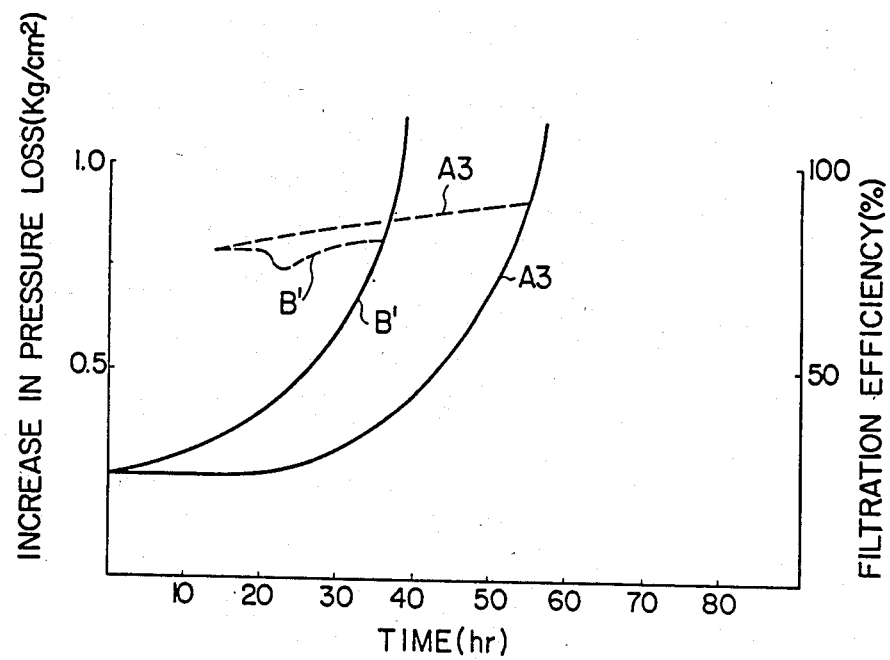
F I G. 13

GRADIENT DENSITY FILTER MEDIUM

This is a continuation of application Ser. No. 866,223, filed May 22, 1986, now abandoned.

BACKGROUND OF THE INVENTION

The present invention relates generally to filter mediums and more particularly to novel filter media suitable for use in filters such as oil filters and air filters of internal combustion engines.

The filter media used in the oil filters and the air filters of automotive vehicles must effectively remove or retain fine particles such as dust particles entrained in fluids requiring filtration or prefilts and must sustain the satisfactory filtration capability for a long period of time.

In view of the above requirements, there have been devised and demonstrated various types of filter media, but from the standpoint of a high filtration efficiency together with a long service life, they have not been entirely satisfactory in practice.

For instance, there has been proposed (for example, in Japanese Patent Publication No. 54-40778) a filter medium in which a plurality of filter paper sheets each having a different fiber density are laminated together so that the filter medium has a density gradient in the direction of the thickness thereof.

In this prior art density-gradient type filter medium as described above, the density is changed from coarse to dense from the upstream side to the downstream side thereof. As a result, relatively large particles are retained in a relatively low density layer while relatively fine particles are trapped in a relatively high density layer so that not only efficient and satisfactory filtration can be attained but also its service life is increased to some extent, but it has the following deficiencies or problems:

(a) With the prior art density-gradient type filter media of the type described above, the flow velocity of the feed fluid or prefilt passing through a filter medium is high. As a result, it is difficult to retain or trap dust particles by mere contact thereof with the filter medium and the dust particles are positively retained in the deep portion of the filter medium (the so-called filtration through the deep layer) so that the filter medium tends to be plugged or clogged very frequently, and consequently the pressure loss is increased.

(b) According to the results of extensive studies and experiments we have conducted, the porosity at the surface of a prior art filter medium on the upstream side of the feed fluid or "prefilt" is high, so that dust particles tend to be easily trapped in the surface layer, and consequently the formation of a dust cake layer upon the surface layer of the filter medium is adversely affected. As a result, the filtration through the cake layer (the so-called primal filtration) cannot be expected, whereby a long service life of the filter medium cannot be ensured.

SUMMARY OF THE INVENTION

In view of the above described difficulties, one of the objects of the present invention is to provide a filter medium which has a high degree of filtration efficiency and a long service life.

To attain the above and other objects, the present invention provides a first embodiment thereof in the form of a filter medium of the type having a density gradient in the direction of the thickness thereof, characterized in that the density is high at the upstream side and is low at the downstream side. It is more preferable that the surface on the high density side of the filter medium be made fluffy.

A second embodiment of the present invention is characterized in that the filter medium has a density gradient in the direction of the thickness thereof, the density being high on the upstream side and low at the downstream side, and high and low density portions are distributed in the direction of the surface of the filter medium.

A third embodiment of the present invention is characterized in that high and low density portions are distributed in the direction of the surface of the filter medium, and a fluffy layer is formed on the surface at the upstream side of the filter medium.

The above and other objects, effects, features and advantages of the present invention will beomce more apparent frm the following detailed description of some preferred embodiment thereof taken in conjunction with the accompanying drawings.

BRIEF DESCRIPTION OF THE ILLUSTRATION

FIGS. 1 through 9 are fragmentary schematic views of different examples of the filter media according to this invention, each view being taken in a plane perpendicular to the plane of the filter medium;

FIGS. 11, 12 and 13 are graphs illustrating the results of filtration tests.

DETAILED DESCRIPTION OF THE INVENTION

Figure 8A:
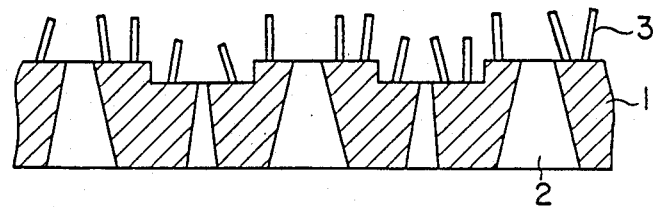

FIGS. 1 and 2 are schematic sectional views of a first embodiment of a filter media in accordance with the present invention. As shown in FIG. 1, each pore 2 of a plurality of pores formed through a substrate 1 is gradually increased in diameter from the upstream side to the downstream side of the substrate 1 with respect to the flow of the feed fluid or prefilt (indicated by arrows). For instance, when the filter medium is made of a fiber material such as filter paper sheets, the fiber density is made high on the upstream side and is made low on the downstream side. In this case, depending upon the kind of feed fluid or infilt, it is preferable that the fiber density in the high density layer of the filter medium be in the range between 0.18 and 0.25 $g/cm^3$, and that the coarse layer have a density ranging from 0.10 to 0.15 $g/cm^3$ when the filter medium is used in the oil filter of an automotive vehicle.

When the fiber density is high on the upstream side of a filter medium and is low on the downstream side as described above, relatively large particles can be prevented from entering into the body of the filter medium, and the formation of a dust cake layer upon the surface of the filter medium is greatly facilitated.

In addition, the flow velocity of the feed fluid or infilt is gradually descreased as it passes through the filter medium so that relatively large particles which have passed through the dense layer can be easily trapped within the body of the filter medium. Furthermore, the density is low at the downstream side of the filter medium, whereby the resistance encountered by the filtrate due to the trapping of such large dust particles can be prevented from being increased appreciably. Therefore clogging within the body of the filter medium is decreased, and the filtration through the cake layer formed over the surface of the filter medium can be utilized further. As a result, a high degree of filtration efficiency and a long service life can be ensured.

When fluff is formed on the upstream side of the filter medium as shown in FIG. 2, the formation of a cake layer is much facilitated. That is, as shown in FIG. 2, dust particles are trapped by a fluffy layer 3, just as snow flakes adhere to the branches of trees, so that the formation of a dust cake layer 4 over the fluffy layer 3 is facilitated. As a result, a high degree of filtration efficiency can be ensured. Furthermore, the bottom of the cake layer 4 and the upper surface of the substrate 1 are spaced apart from each other by a suitable distance so that the flow resistance; that is; the pressure loss can be reduced. Moreover, fluff 3 is formed on the high density layer of the substrate 1 so that even when the cake layer 4 is formed, fluff 3 is prevented from being bent.

The fluffy layer is formed when the ends of the fibers of the filter medium are projected upwardly beyond the upper surface of the filter medium and fluffed. It suffices that fluff is extended upwardly from the upper surface of the filter medium in such a way that the large dust particles are trapped, whereby the dust cake layer 4 is formed, and it is not necessary that the density of the fluffy layer be as high as that of a grassy lawn. For instance, a height of fluff of 80 to 300 microns is sufficient when the particle size of dust is of the order of 5 to 70 microns.

FIG. 3 shows a schematic sectional view of a second embodiment of a filter medium in accordance with the present invention. Each pore 2 is increased in diameter from the upstream side to the downstream side of the passage through the filter medium of the feed fluid or prefilt (indicated by arrows). In addition, high density portions having relatively small pores and low density portions having relatively large pores are distributed in the direction of the surface of the substrate 1.

As described above, the density is high on the upstream side of the filter medium while the density is low on the downstream side thereof so that the same effects as attained by the first embodiment of the invention described above with reference to FIGS. 1 and 2 can be obtained.

Furthermore, according to this second example, the high density portions having relatively small pores and the low density portions having relatively large pores are uniformly distributed in the direction of the surface of the substrate 1 in addition to the fact that the pores are gradually increased in diameter from the upstream side of the filter medium to the downstream side thereof, whereby the dust particles can be trapped stepwise. That is, the clogging of the filter medium resulting from the trapping of dust particles occurs first at the high density portions and then at the low density portions. As a result, as compared with a filter medium in which the density is uniform in the direction of the surface thereof, the pressure loss can be reduced, and a long service life can be ensured. In addition, the relatively fine particles are retained at the high density portions while relatively coarse particles are trapped at the low density portions. Therefore when the high density portions and the low density portions are combined in a suitable manner in terms of a ratio between the area of the high density portions and the area of the low density portions, the filtration efficiency can be improved. The density in the direction of the surface of the filter medium can be varied continuously or stepwise.

FIGS. 4 and 5 are schematic sectional views of a third embodiment of a filter medium in accordance with the present invention. In this third example, the upper or lower surface of the filter medium is formed with recesses so as to provide a density difference.

In the case of FIG. 4(a), the upper surface (that is, the upstream surface) of the filter medium is formed with recesses so that the recessed portions become low density portions while the raised portions become high density portions. In the case of FIG. 4(b), the lower surface of the filter medium is formed with recesses.

In the cases of FIGS. 5(a) and (b), recesses are formed at the high density portions of the filter medium while the raised portions are formed at the low density portions.

In general, coarse particles tend to be collected at low density portions while fine particles tend to be collected at the high density portions. Therefore when the filter medium has the construction as shown in FIG. 4(a), the level of the dust cake layer can be maintained constant, so that the flow velocity of the feed fluid or prefilt passing through the raised and recessed portions can be maintained constant, and consequently the filtration efficiency can be improved.

FIGS. 6 through 9 are schematic sectional views of a fourth embodiment of a filter medium in accordance with the present invention. In the case of the filter medium as shown in FIG. 6, low density portions having large-diameter pores 2 and high density portions having small-diameter pores 2 are distributed in the direction of the surface. Furthermore fluff 3 is formed at the upper surface (that is, the upstream surface) of the filter medium. The feed fluid or prefilt passes the filter medium in the direction indicated by arrows.

In the filter medium shown in FIG. 6, the high density portions having relatively small-diameter pores and the low density portions having relatively large-diameter pores are uniformly distributed in the direction of the surface of the substrate so that the dust particles can be trapped stepwise. That is, the clogging of the filter medium resulting from the trapping of the dust particles first occurs at the high density portions and then at the low density portions. As a result, as compared with a filter medium in which the density is uniform in the direction of the surface, sudden increase in pressure loss can be prevented, and a further long service life can be ensured.

In addition, fine particles tend to be trapped at the high density portions, while coarse particles tend to be collected at the low density portions or layers so that when the density in the high and low density portions is suitably selected, and the ratio between the areea of the high density portions and the area of the low density portions is also suitably selected, the filtration efficiency can be further improved.

In the case of the filter medium shown in FIG. 6, the fluffy layer is formed at the upper or upstream surface of the medium so that, as described elsewhere, dust particles are trapped by fluff just as snow flakes are trapped by the branches of trees, and consequently the formation of the dust cake layer over the fluffy layer can be facilitated. The filtration through the cake layer (primal filter function) can be utilized so that the filtration efficiency can be further improved. The density in the direction of the surface can be changed continuously or stepwise.

As described elsewhere, the fluffy layer can be formed when the ends of the fibers of the filter medium are extended upwardly beyond the upper surface thereof and then fluffed. A sufficient height of fluff is such that coarse dust particles are trapped by the fluff, and the formation of the cake layer over the fluffy layer is facilitated. It is not necessary as described above that the density of the fluffy layer be as dense as that of a grassy lawn. A height of the fibers extended upwardly beyond the surface of the substrate by 80-300 microns is sufficient when the particle size of dust is of the order of 5 to 70 microns.

In the case of a filter medium as shown in FIG. 7, the density is changed in the direction of the thickness of the filter medium. That is, the density is made high on the upstream side of the feed fluid or prefilt passing through the filter medium and is made low on the downstream side. Therefore relatively coarse dust particles are prevented from being retained within the body of the filter medium so that clogging of the body of the filter medium can be avoided. As a result, a long service life of the filter medium can be ensured. Since the pores 2 are gradually increased in diameter from the upstream side of the filter medium to the downstream side thereof, the increase in flow resistance in the dust cake layer formed over the fluffy layer can be cancelled. Moreover, fluff is formed on the high density side so that even when the cake layer is formed, fluff can be prevented from being bent as described above.

Figure 8B:
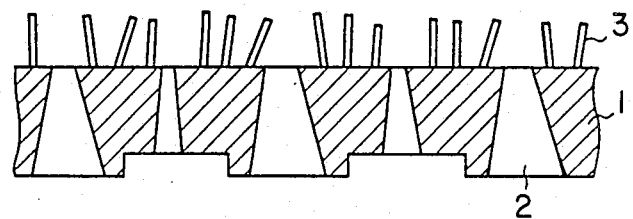
Figure 9A:
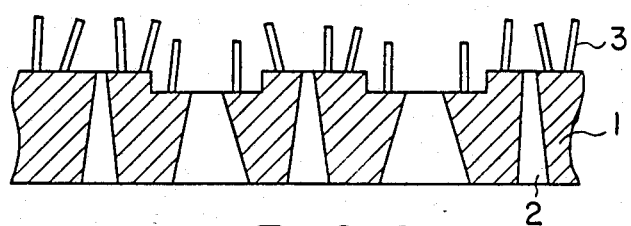
Figure 9B:
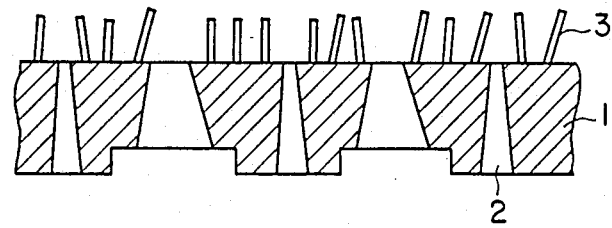

In the cases of the filter media as shown in FIGS. 8 and 9, the upper or lower surface of the filter medium is formed with recesses so that the density can be changed in the direction of the surface.

In the cases of the filter media as shown in FIGS. 9(a) and (b), a recess is formed at a high density portion while a raised portion is formed at a low density portion. In the cases of the filter media as shown in FIGS. 9(a) and (b), a recess is formed at a low density portion while a raised portion is formed at a high density portion. In general, coarse particles tend to be trapped at the high density portions while fine particles tend to be collected at the low density portions. Therefore, in the case of the filter medium shown in FIG. 9(a), the level of the dust cake layer can be maintained constant, whereby the flow rate of the feed fluid or prefilt passing through the raised and recessed portions can be maintained constant, and consequently the filtration capability can be improved.

Next, the method for fabricating the filter media in accordance with the present invention will be described. The filter media in accordance with the present invention can be fabricated from natural fibers, manmade fibers, and mixtures thereof. If required, a binder such as phenol resin and other suitable additives can be added.

In order to change the density in the direction of the thickness of filter medium, a plurality of filter media each having a different density can be combined integrally. Alternatively, when a filter medium is fabricated, slurries each having a different fiber distribution can be sequentially supplied.

Furthermore, the upper or lower surface of a filter medium is formed with recesses so that the density of the filter medium can be varied as described elsewhere. For instance, prior to the drying process, a layer of wet webs formed on a wire belt or screen and consisting of filter-medium-making slurries is placed in contact with a special roll having raised and recessed portions formed on the cylindrical surface thereof so that the layer is formed with raised and recessed portions. Concurrently, the density can be so changed that high and low density portions will be distributed in the direction of the surface of the filter medium.

In order to fluff the surface of a filter medium, while the filter-paper-making slurries are supplied to the papermaking wire belt or screen, the slurries are sucked from the surface of the wire belt or screen opposite to the surface on which are fed the slurries, so that the axes of the fibers become perpendicular to the slurry surface, whreby a fluffy layer can be satisfactory formed.

When the filter media in accordance with the present invention are used in the air filters and the oil filters of automotive vehicles, it is preferable that the filter medium be in the form of a cylinder and appear like a chrysanthemum when viewed from the top so that the filtration area can be enlarged. Furthermore, disk-shaped metal or plastic plates are integrally attached or joined to the ends of the filter medium.

FABRICATION EXAMPLE 1

A papermaking machine is used to fabricate a filter medium having a weight of 145 g/m$^2$ and a thickness of 0.8 mm. A papermaking slurry having the following composition is prepared, and its concentration is controlled on 0.07% by a concentration controller.

liners: 50% by wt.
wood pulp: 30-40% by wt.
chemical fibers (4-8d, 6 mm in length): 10-20% by wt.

While the slurry is agitated by a plurality of blades, it is fed by a pump over a papermaking screen (70 mesh, plain weave wire) (at a flow velocity of 66 m/min.). Concurrently the slurry is sucked by four suction boxes disposed on the opposite side of the screen. The suction presssures are 13 in Hg, 10 in Hg, 5 in Hg and 11 in Hg in the order named from the upstream side to the downstream side of the slurry flow. Thereafter the surface layer of the wet sheet on the papermaking wire is compressed by a roller, and the wet web is dried, whereupon a filter medium is obtained.

Figure 10:
FIG. 10 is a photomicrograph (X) illustrating the section of a filter medium in accordance with the present invention.

The filter medium thus fabricated changes its density in the direction of the thickness thereof and a fluffy layer consisting of stake-shaped fibers is formed on the high density layer side of the filter medium. The diameters of the pores of the high density layer are 30 to 40 microns while the diameters of the pores of the low density portions are 70 to 100 microns. The height of fluffed fibers is 80 to 300 microns. FIG. 10 is a photomicrograph illustrating a section of the filter medium thus obtained.

TEST EXAMPLE 1

The filter medium fabricated in the manner described above was subjected to the filtration test specified in Japanese Industrial Standards designation JIS-D1611. The effective filtration area of the filter medium was 1,000 cm$^2$; the flow was 10 l/min; and the oil temperature was 80° C.

Fifty-five hours after the beginning of the test, a dust cake layer 0.3 to 1 mm in thickness was formed over the upper (or the upstream) surface of the filter medium. As compared with the prior art filter media, the increase in pressure loss was less, and the service life was increased by about 180%.

FIG. 11 shows not only the results of the filtration test of the filter medium A1 fabricated in the manner described above but also the results of a test of a prior art filter medium B having no density gradient. It is clearly seen that the increase in pressure loss resulting from the trapping of dust particles entrained in the fluid or prefilt is gradual without causing any variation in filtration efficiency. Thus the service life of the filter medium can be remarkably increased.

TEST EXAMPLE 2

FIG. 12 shows the results of test specified in JIS-D1611 of the filter medium A2 in accordance with the present invention as shown in FIG. 3 and a prior art filter medium.

The effectivbe filtration area was 1,000 cm$^2$; the flow rate was 10 l/min; and the oil temperature was 80° C. It is clearly seen that the increase in pressure loss resulting from the trapping of dust particles entrained in the feed fluid or prefilt is gradual without causing any variation in filtration efficiency. Thus the service life of the filter medium can be considerably increased.

TEST EXAMPLE 3

A filter medium A (as shown in FIG. 9(a)) in accordance with the present invention and a prior art filter medium B were subjected to the filtration tests as specified in JIS-D1611. The results are shown in FIG. 13.

The effective filtration area was 1,000 cm$^2$; the flow rate was 10 l/min; and the oil temperature was 80° C. It is apparent that the increase in pressure loss resulting from the trapping of dust particles entrained in the feed fluid or prefilt is gradual without causing any variation in filtration efficiency. Thus the service life of the filter medium can be remarkably increased.

What is claimed is:

1. A filter medium for filtration of a fluid to flow therethrough from one side of the filter medium to an opposite side thereof, said filter medium comprising a filter substrate having a density gradient wherein the density is high on the one side and a low density on the opposite side of the substrate, the filter substrate having pores increasing in cross section from said one side toward the opposite side thereof, and a fluffy layer formed on said one side having a high density, said fluffy layer comprising upstanding end portion of fibers extending from said filter substrate.

2. A filter medium for filtration of a fluid flow therethrough from one surface to an opposite surface thereof, said filter medium comprising a filter substrate having a density gradient werein the density varies from a high value at the one surface to a low value at the opposite surface, high and low density portions of the filter substrate being distributed in directions parallel to the surfaces, the filter substrate having pores increasing in cross section from the one surface to the opposite surface thereof, said one surface or said opposite surface having raised and recessed portions distributed thereon, and said high value density portions and said low value density portions corresponding to the recessed or raised portions respectively.

3. A filter medium for filtration of a fluid flow therethrough in a thickness direction from one surface to an opposite surface thereof, said filter medium comprising a filter substrate having therein high and low density portions distributed in directions parallel to said surfaces, a fluffy layer of upstanding end portions of fibers formed over the substrate on the one surface thereof, and the filter substrate having pores increasing in cross section throughout the thickness direction from said one surface to said opposite surface thereof.

4. A filter medium as set forth in claim 3, wherein said substrate has a density gradient in a direction of the thickness thereof, wherein the density varies from a high value at the one surface to a low value at said opposite surface.

5. A filter medium medium as set forth in claim 4, wherein the one or opposite surface of said substrate is formed with raised and recessed portions, and said high density portions correspond to said recessed portions while said low density portions correspond to said raised portions.

6. A filter medium as set forth in claim 4, wherein the one or opposite surface of said substrate is formed with raised and recessed portions, and said high density portions correspond to said raised portions, while said low density portions correspond to said recessed portions.

7. A filter medium as set forth in claim 3, wherein the one or opposite surface of said substrate is formed with raised and recessed portions, said high density portions distributed in directions parallel to the surfaces correspond to said recessed portions, and said low density portions correspond to said raised portions.

8. A filter medium as set forth in claim 3, wherein the one or opposite surface of said substrate is formed with raised and recessed portions, said high density portions correspond to said raised portions, and said low density portions correspond to said recessed portions.

9. A filter medium as set forth in claim 3, in which said upstanding end portions of fibers are of a length and number effective to allow a cake of filtered particles to form thereon and be supported spaced from the substrate.

* * * * *